July 13, 1954
G. B. LENHART
2,683,286
APPARATUS AND PROCESS FOR MAKING NONLAMINATED
MONOSTRUCTURE RUBBER GLOVES
Filed Feb. 14, 1951
4 Sheets-Sheet 2
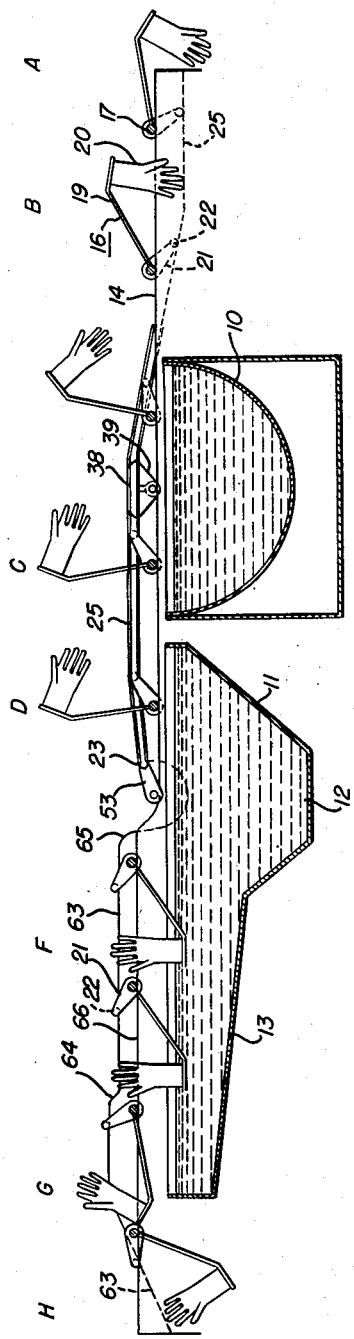
Fig. 3
Fig. 4
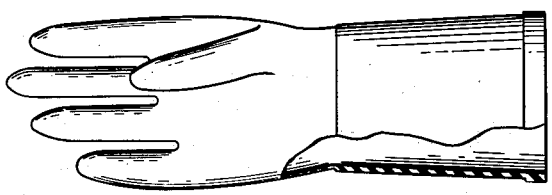
INVENTOR.
George B. Lenhart
BY Woodling and Krost
attys July 13, 1954   G. B. LENHART   2,683,286
APPARATUS AND PROCESS FOR MAKING NONLAMINATED
MONOSTRUCTURE RUBBER GLOVES
Filed Feb. 14, 1951   4 Sheets-Sheet 3
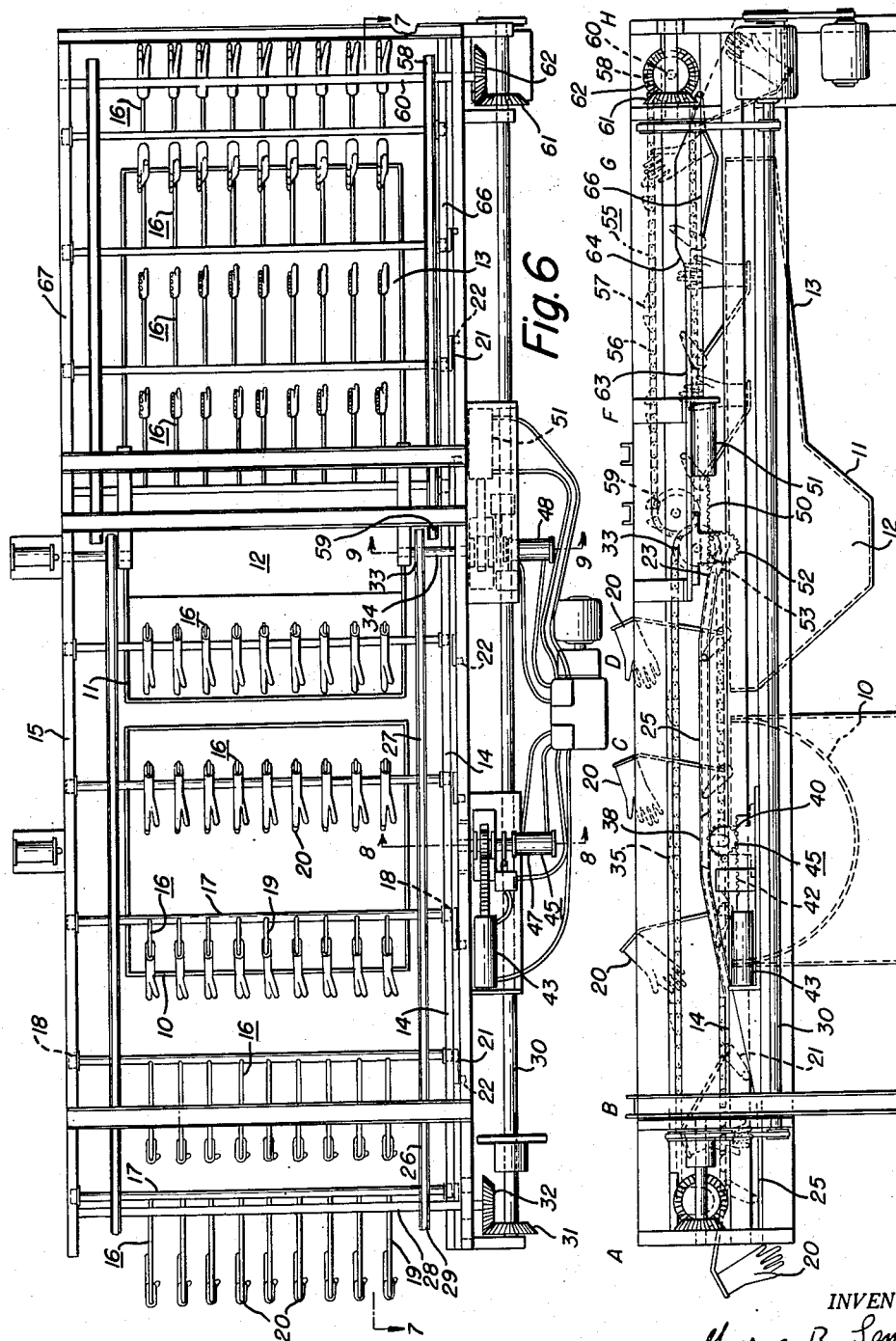
INVENTOR.
George B. Lenhart
BY Woodling and Krost
attys

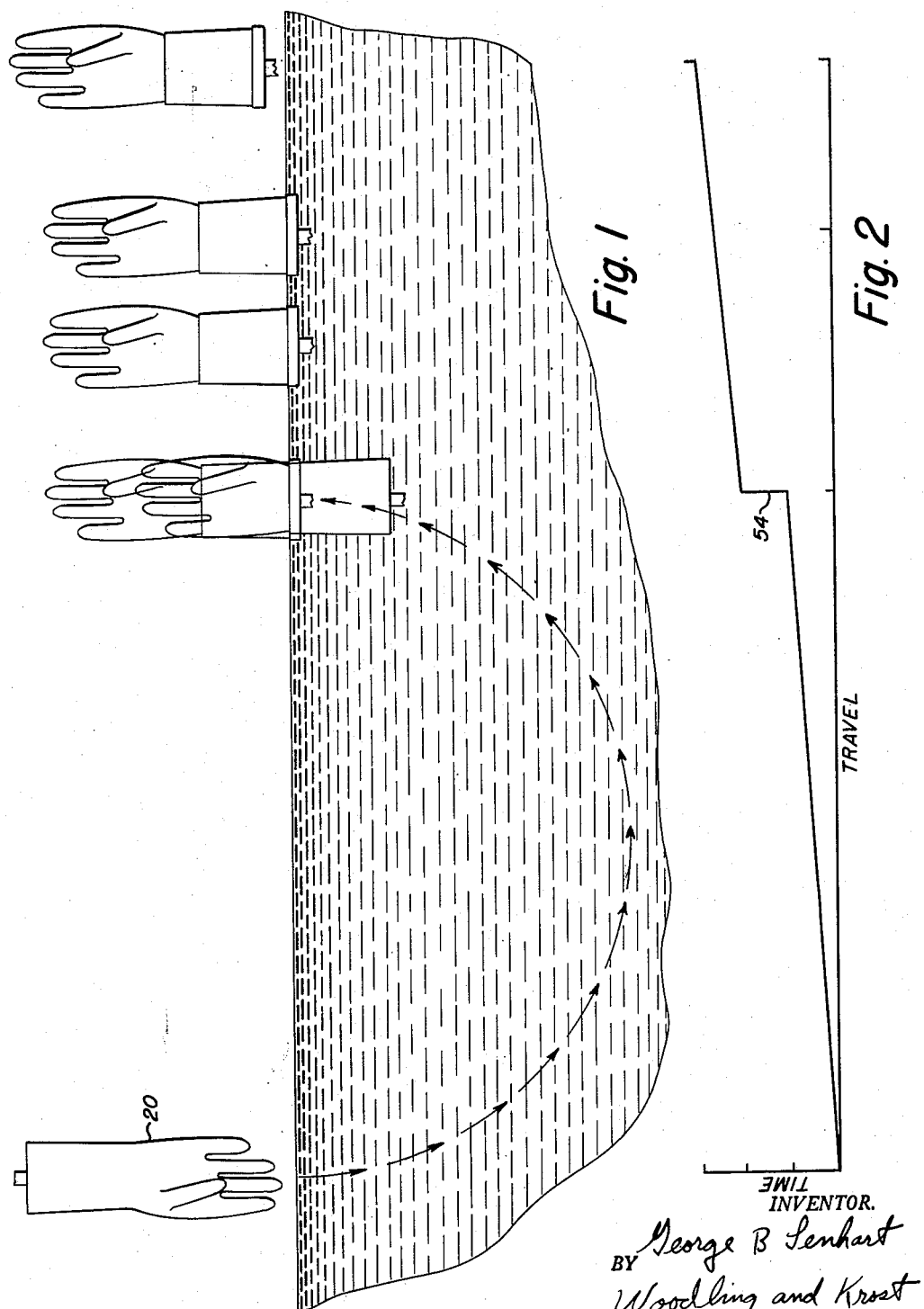

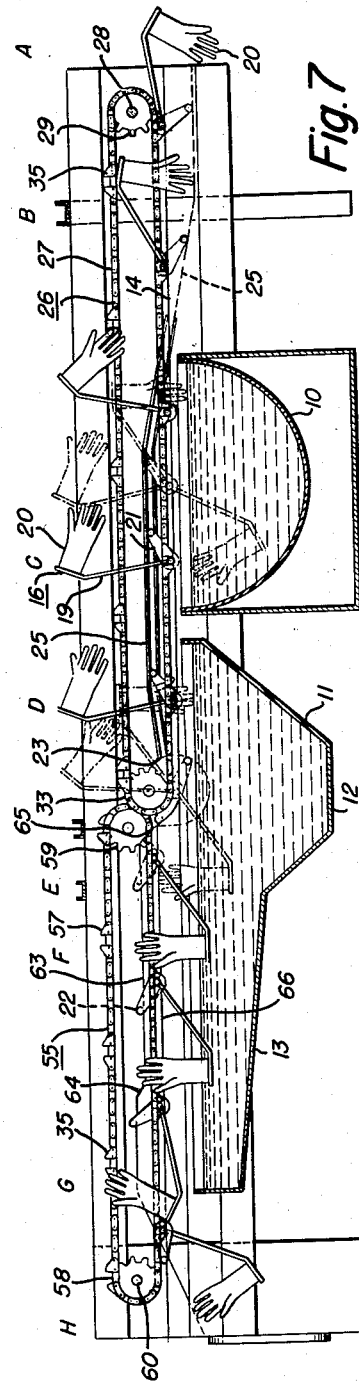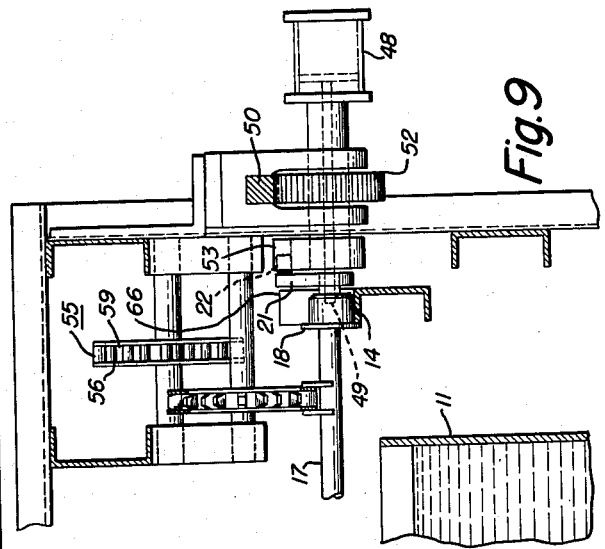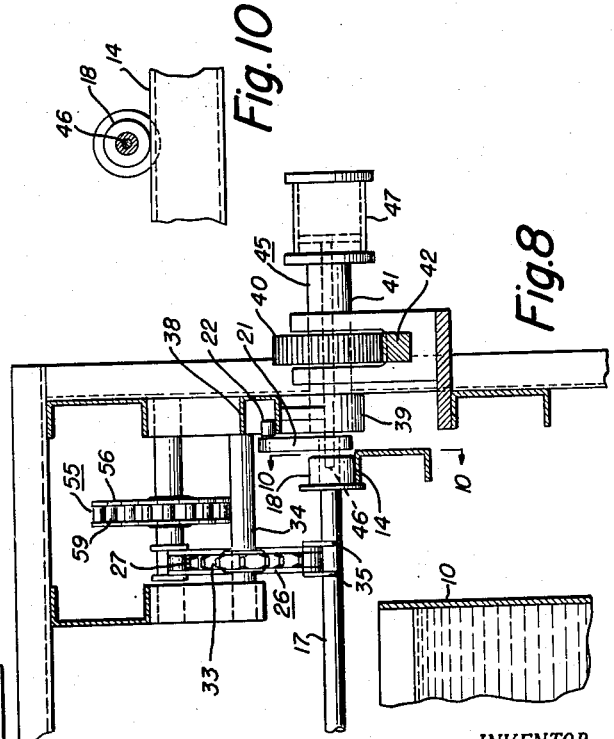

Patented July 13, 1954

2,683,286

UNITED STATES PATENT OFFICE 2,683,286

APPARATUS AND PROCESS FOR MAKING NONLAMINATED MONOSTRUCTURE RUBBER GLOVES

George B. Lenhart, Canton, Ohio, assignor to The Wilson Rubber Company, a corporation of Ohio Application February 14, 1951, Serial No. 210,919

12 Claims. (Cl. 18—24)

This invention relates in general to apparatus and processes for molding rubber goods by dipping, and relates specifically to apparatus and the process for producing rubber gloves having a stepped, but non-laminated, monostructure.

An object of this invention is to provide a mechanical dipping apparatus which will dip a mold form through a tank of solution, with an arcuate dipping motion.

Another object of this invention is to provide dipping apparatus to carry a continuous series of forms along above a tank of dipping solution, and cause each form to dip through said solution in an arcuate path as it passes over the tank.

Yet another object of this invention is to control such arcuate dipping to immerse the forms rapidly into the tank, and withdraw the forms from said tank at variable speeds to form thin deposits on parts of the form and thick deposits on others.

And another object of this invention is to provide a dipping machine having a conveyor system of two conveyor sections, one fast and one slow, for maximum dipping in a short distance.

Still another object of this invention is to provide a conveyor system which will oscillate and rotate a form carrier as the carrier is advanced forward over a course by the conveyor.

Another object of this invention is to dip a glove form in a tank of film-forming solution in an arcuate path, and with predetermined periods of dwell with relationship to the surface of the solution, to produce a molded article having a non-laminated monostructure of variable thickness.

Other objects and a fuller understanding of the invention may be had by referring to the following description and claims, taken in conjunction with the accompanying drawings, in which:

Figure 1 is a diagrammatic illustration of the path of travel for a glove form following the process of this invention;

Figure 2 is a graphical representation of the time and distance relationship of a mold form movement following the process of this invention;

Figure 3 is a diagrammatic and fragmentary illustration of the conveyor machine used to move the glove form;

Figure 4 is a cross-sectional view of a glove made by the herein disclosed machine and process;

Figure 5 is a side elevation view of the preferred embodiment of this invention, but eliminating certain unnecessary detail for a better illustration of the basic functional parts;

Figure 6 is a top plan view of the same machine, again eliminating detail unnecessary to the full understanding of the invention;

Figure 7 is a substantially diagrammatic sectional view taken along line 7—7 of Figure 6 illustrating the functional structure of the machine, showing the proper spaced relationship of the mold racks in full lines, and with dotted outlines of the racks therebetween showing various positions through which the racks pass in traveling along the conveyor system;

Figure 8 is a sectional view taken along line 8—8 of Figure 7;

Figure 9 is a sectional view taken along line 9—9 of Figure 7; and

Figure 10 is a sectional view taken along line 10—10 of Figure 8.

Doctors and surgeons, as is well known, must wear rubber gloves when performing their duties, especially in the operating room. These surgeons must have a rubber glove with the fingers as thin as reasonably possible in order that they can feel through the gloves with reasonable accuracy for doing such fine jobs as tying very thin cord. For example, some doctors and surgeons employ number 60 thread for tying blood vessels and must be able to feel this cord and handle it with ease even with rubber gloves on their hands. It is even more true, of course, that the doctor or surgeon must be able to handle his equipment with ease and be able to feel through the glove as he performs his delicate task.

Because of the way in which the gloves are sterilized in an autoclave, and the way in which the doctor pulls the gloves upon his hands, the gloves are placed under an extremely high strain and have been found to have a very short useful life if they are made thin enough to afford the touch transparency which the doctor wants. On the other hand attempts to make the cuff area of the glove stronger by redipping and similar laminating processes, are not satisfactory for the reason that the gloves deteriorate under the high autoclaving temperatures used for sterilizing the gloves and tend to come apart between the plies of the two layers formed by redipping.

Doctors and surgeons have long used a type of glove having an overall general thickness which is a compromise between the desirable extremely thin finger covering, and the practical strength needed to resist the effect of the doctor's pull on the wrist area of the glove in placing the glove on his hand. Many gloves are still made today by a single dip of either latex or cement rubber with the cuff formed by rolling a portion of the wrist area of the glove upon itself before the glove is cured. This beaded type of cuff band is provided by trimming the material on the mold prior to curing the rubber, and then rolling the material down a short way. Some manufacturers of rubber gloves have attempted to improve upon the conventional glove by placing a flat band of rubber around the cuff edge of the glove rather than providing a rolled bead edge. A flat band at the cuff of the glove has been found to prevent undue tendency of the wrist portion of the glove to roll down upon the surgeon's wrist while he is working. In other words the cuff band, being a thick and narrow band, resists rolling upon itself, and therefor, resists the attempt of the glove to roll as the surgeon brushes against his coat and other objects during his work. It is, of course, obvious that the surgeon desires to have his gloves extend fully up upon the arms of his gown rather than rolling down about his wrist as he works. The cemented glove cuff has been found to be entirely satisfactory for preventing the glove from rolling, but the band very often fails and comes loose under the extreme autoclave sterilizing temperatures and the subsequent extreme stressing of the wrist area and cuff area of the glove by the surgeon when installing the gloves on his hands. Furthermore, the provision of a flat band to prevent undue tendency for the glove to roll does not in any manner overcome the need for a glove with extremely thin finger areas.

I have discovered that a glove having a flat cuff band with a molded hand portion and an intermediate wrist portion extending between the cuff band and the hand portion will give superior results if the entire glove structure is a non-laminated monostructure with a continuous stepless interwall surface and a continuous stepped outer surface with the hand portion having a first thickness of extremely thin dimensions and the cuff portion having a second thickness which is considerably more than the hand thickness and with the wrist portion between the hand and the cuff portion being tough and stretch-resistant with a third thickness greater than the thickness of the hand portion and less than the thickness of the cuff portion. (See Figure 4.) The very thin hand portion, which may be said to be flimsily thin with touch transparency, satisfies the doctor's need for being able to feel what he is working with, and the thick cuff portion is thick enough to be roll resistant. Because the cuff portion is quite narrow and thick, it will not have a tendency to roll upon itself, and therefore will aid materially in keeping the glove in place without the tendency to roll down upon the doctor's arm. Furthermore, the intermediate portion between the hand and the cuff portion is amply thick to resist the unduly great stresses which the doctor places upon the glove in getting it onto his hand, but is not so thick as to be over tight upon his wrist. A separate patent application describing and claiming this glove structure has been filed by applicant.

After having conceived of the type of glove which would meet the surgeon's requirement, and having made samples of these superior gloves by hand-dipping methods, I searched the available technical literature for machinery and methods for dipping, and also caused a search of considerable proportions to be conducted in the United States Patent Office to determine what methods were available for dipping gloves which would satisfy my process. I found that there was nothing available to do the dipping job that would provide the three stepped glove which I desired.

After considering the methods which were available to me in the literature, I conceived the thought of dipping a glove form, or any form upon which a rubber article is to be molded, into a coating fluid with the finger-shaping portions first penetrating the surface of the fluid and then removing the glove form from the solution partway with the finger-shaped portions of the glove form emerging from the surface of the fluid first. Thereafter, I conceived of holding the glove form with the hand portion out of the fluid and the remainder partially submerged for a period of time until a thicker coating could be deposited upon the part remaining submerged in the solution, and thereafter raising the entire glove form from the dipping fluid.

The search of the United States patents revealed a patent to H. C. Miller 1,952,935, patented March 27, 1934, which teaches the use of a glove form on a rack in order that the glove form can be rotated through a semi-circular path to cause the glove form to enter the dipping solution finger first and exit from the dipping solution finger first to prevent the formation of webs between the finger areas of the form. Other than the circular method of dipping, the Miller patent teaches nothing with respect to the invention as I have conceived it because the motion through the dipping fluid is continuous into and out of the solution. I have provided for causing the glove form to stop partially submerged in the fluid for a period of time to create a thicker deposit upon a portion of the glove form. Furthermore, Miller does not teach the mechanism for accomplishing this improved dipping as I have disclosed hereinafter.

*Process*

Figure 1 of the drawings illustrates the preferred process for producing rubber gloves for surgeons. The basic process of dipping the form into the solution finger first and then raising the form out of the solution finger first in combination with a period of dwell for the purpose of building up a thicker wrist portion, is improved by the provision of first holding the glove form in a first dwell position with the hand portion out of the fluid and the remainder partially submerged for a period of time, and thereafter raising the glove form to a second dwell position further out of the fluid with a smaller portion remaining submerged, and then finally raising the entire glove form from the dipping fluid. The Figure 1 further illustrates the improved process wherein the glove form is raised partially out of the fluid up to the wrist area of the glove for a period of time, and then raised further out of the solution until only the cuff portion remains in the solution, whereafter the glove form is moved longitudinally along the surface of the fluid with only the wrist portion submerged until the time has passed to build up a sufficient deposit upon the wrist. Figure 2 illustrates the time and distance relationship with respect to the surface of a tank of dipping fluid to further illustrate this improved process. In other words, Figures 1 and 2 illustrate a process which will best utilize the available surface area of a small dipping tank. If the glove form were permitted to remain in the first position from which it emerged from the tank of fluid until the wrist area was built up to its proper thickness, then the area for causing an arcuate dipping through the tank would be tied-up until the wrist was built to its proper thickness. However, by causing the glove form to move laterally along the surface of the fluid as soon as it has been withdrawn from the solution to the second dwell position, a second glove form may be brought through the arcuate path indicated by the arrows, and therefore the solution can be utilized more fully.

*Mechanical dipping apparatus*

In order to carry out the improved process incorporating the arcuate dipping movement coupled with periods of dwell, I have provided improved mechanical dipping apparatus which is illustrated in its preferred embodiment in the Figures 3 and 5 through 10 of the drawings. In these figures a tank 10 is provided in which a suitable coagulant for rubber latex may be provided. It is to be understood that this improved process and the apparatus for carrying out the process may be used equally well with all types of dipping solutions which will form a film upon a dipping mold. Such solutions include natural and synthetic rubbers as well as the newer plastic materials. However, at the present time, natural rubber latex is still considered to be the most suitable material for making rubber gloves for use by surgeons, and accordingly the tank 10 is provided in order to hold the coagulant which the trade has considered to be the best method of causing natural rubber latex to precipitate upon a mold. Natural rubber latex, as it comes from the rubber tree, will coagulate quickly in the atmosphere, but may be stabilized by suitable peptizing agents, and generally thhe ammonium ion is used for this purpose. Therefore, in order to cause the rubber latex to precipitate upon the surface of the glove form a material which will overcome the peptizing action of the ammonium ion is first coated over the surface of the glove form in a concentration corresponding to the thickness of the desired deposit of the rubber upon the form. However, it is impractical to attempt to completely control the thickness of the rubber deposit solely by the concentration of the coagulant coated upon the glove form. For example, a light concentration of coagulant will cause a relatively thick deposit of rubber if the form is held in the solution of rubber latex for a considerable period of time, whereas a relatively heavy concentration of the coagulant will cause only a thing deposit of the film if the form is passed too rapidly through the solution. Therefore in my improved process I place a suitable coating of coagulant upon the glove form and then modify the thickness of the actual deposit by regulating the period of dwell in withdrawing the glove form from the solution until I have achieved the proper deposit of rubber thickness on the various sections of the glove form. Therefore, the tank 10, although necessary for depositing rubber latex solutions upon forms may be unnecessary in other types of dipping materials. Nevertheless, the apparatus employed to dip the glove forms in the tank of coagulant is believed to be novel and a useful improvement on present apparatus for dipping rubber glove forms.

A second tank 11 is used to hold the rubber latex solution, or the plastic dipping solution, as the case may be. The tank 11 has a deep portion 12 and a shallow portion 13. The tanks 10 and 11 are arranged in longitudinal relationship with respect to one another.

Dipping of rubber gloves is carried out at the present time by holding the glove forms on a rack and moving the forms into a solution and then raising the glove forms upwardly along the same path until they are withdrawn from the solution. It is not practical to attempt to run a conveyor in a solution of dipping material because the moving parts would soon become fouled by deposits of the dipping material. In the previously mentioned Miller patent, a knowledge of this requirement is illustrated by the provision of the long arm operating from a hand dolly above the dipping solution. Such a hand dolly, however, is impractical in modern mass production factories. In my apparatus I have provided a framework over the tanks 10 and 11 principally for the purpose of providing two laterally spaced tracks 14 and 15. A plurality of dipping frames 16 are provided to ride the tracks. Each dipping frame 16, in the preferred embodiment of the invention, has a longitudinal bar frame 17 with wheels 18 on the ends thereof to ride the tracks 14 and 15. The bar 17 is the axis of the dipping frame 16. Each dipping frame has a plurality of arms 19 extending laterally from the bar 17, and each of the arms 19 has a dipping mold 20 on the end thereof. Any convenient number of arms 19 and molds 20 may be provided on each of the bars 17. The bar 17 may then be oscillated with a rotary oscillatory movement or rotated through a 360° rotation to cause the molds 20 to either dip downwardly and return back to the starting position, or to completely rotate through an arcuate path.

Each of the dipping frames 16 is provided with a crank arm 21 on the end thereof, and each crank arm has a cam follower 22 on the end thereof.

A longitudinally extending cam track 25 is mounted to extend along above the tanks 10 and 11 in the general direction of the tracks 14 and 15. The cam track 25, although extending in the general direction of the tracks 14 and 15, is shaped to provide a cam path which is undulated with respect to the track. The general shape of the cam track is illustrated in Figures 3, 5, and 7 of the drawings. Thus, the dipping frame will ride along the parallel tracks 14 and 15 in a relatively straight and level path, but the cam follower 22 on the end of the crank arm 21 is engaged with the undulating cam track 25. Therefore, the crank arm 21 will continually tend to cause the bar 17 to oscillate, because the crank arm will oscillate between the vertically fixed position of the wheels 18 and constantly shifting position of the cam follower 22, as the dipping frame 16 is moved longitudinally along the tracks 14 and 15 relative to the undulating cam track 25.

The relative position of a single dipping frame 16, as it passes continually along my improved track and cam combination may best be seen in Figures 3 and 5 of the drawings. The dipping frame is placed upon the dipping device at position A indicated at the left side of Figure 5 and the right side of Figure 3. At position A the crank arm 21 extends downwardly from the tracks 14 and 15 to allow the cam follower 22 to engage the cam track 25, which cam track 25 is lower than the tracks 14 and 15 in the position A. The dipping frame is then moved longitudinally along the tracks 14 and 15 to position B where the cam track 25 may be seen to be sloping upwardly with respect to the tracks 14 and 15 thereby causing the crank arm 21 to rotate in a clockwise direction and lift the glove forms upwardly. This particular movement in the preferred embodiment of the invention is necessary in order for the glove forms to pass under associated belts and machinery of the particular construction, and bears no other significant part with respect to actual dipping.

As the dipping frame 16 is further advanced along the tracks 14 and 15, it may be seen that the molds 20 have been rotated beyond a vertical position when they reach the position C, and therefore would tend to fall in a clockwise direction around the axis provided by the bar 17. However, the cam track 25 is formed with a channel cross-section, as best illustrated in Figure 8 of the drawings, and therefore the cam follower 22 will be restrained against movement beyond the limits of the cam track and will therefore maintain the dipping frame 16 in its proper position.

A conveyor 26 is positioned above the tank 10 and extends in a generally longitudinal direction with respect to the tracks 14 and 15 and the cam track 25. The conveyor 26 has a link chain 27 which carries a series of engagement lugs 35. A shaft 28 is mounted to extend in a lateral direction with respect to the tracks 14 and 15 and carries cogwheel 29 thereon for engaging and driving the chain 27. A second cogwheel 33 is mounted on a shaft 34 beyond the opposite end of the tank 10, as illustrated in the Figures 5 and 6. Therefore, the chain 27 is rotatable in an endless path around the cogwheels 29 and 33 upon the shafts 28 and 34. The shaft 28 is driven by a main drive shaft 30 through the two bevel gears 31 and 32. The main drive shaft 30 is mounted laterally with respect to the tracks 14 and 15 and outside of the cam track 25. The main drive shaft 30 may be driven by any suitable power means, preferably an electric or hydraulic motor.

The lugs 35 on the chain 27 are adapted to engage the various dipping frame 16 by contacting the bar 17 of the dipping frame, and therefore will force the dipping frame to ride along the tracks 14 and 15. Thus, actuation of the conveyor 26 will cause the dipping frames 16 to move along through the positions indicated in the Figure 5 of the drawings, particularly through the positions A, B, and C as previously discussed, and will thereby cause the glove dipping molds 20 to move through a continually advancing path and simultaneously oscillate through an arcuate path according to the position of the cam track 25. Thus, if the position of one spot upon any particular mold 20 was to be plotted through the movement of that mold 20 along the tracks 14 and 15, an undulated path of substantially wave form would be described.

The invention, as thus far described, may be said to comprise first and second laterally spaced tracks with a dipping frame mounted to ride the spaced tracks. A conveyor drive means is provided to advance the dipping frame along the tracks. The dipping frame has an axis of oscillatory rotary movement extending in a generally lateral direction between the tracks. A cam follower carried by the dipping frame, and a cam track extending in the direction of the spaced tracks, causes the cam follower to move according to the form of the cam track and translate relative movement imposed thereon by the cam track into rotary oscillatory movement of the axis of the dipping frame. The dipping frame has mold forms thereon mounted a distance from the frame axis, and therefore the mold forms describe a wave form path as the frame is advanced along the tracks.

As previously stated, it is desired to dip the molds into a tank 10 of coagulating solution. Therefore, a first rotation station having a releasable pivot actuatable to engage the frame is provided. The releasable pivot has a longitudinally fixed but axially rotatable grip. This station is best illustrated in the Figures 5 and 8 of the drawings. The cam track 25 has a rotatable section 38 mounted upon a bracket 39 suitably bearinged on the frame of the machine for rotation about a 360° path. A pinion gear 40, as best illustrated in Figure 5, is drivingly connected to the rotatable section 38 through a drive shaft 41. A rack 42 is driven by a hydraulic servomotor 43, and is engaged with the pinion 40 to rotate the section 38 through a 360° reversible cycle.

A releasable pivot engagement member 45, in the form of a plunger pin 46, and a servomotor 47 is provided in conjunction with the rotatable section 38. Each of the bars 17 has a pin receiving chamber on the end thereof formed to receive the end of the pin 46, and thereby be longitudinally fixed, but rotatable upon the pin 46 as as pivot. (See Figures 8 and 10.) The servomotor 47 may be actuated to force the pin 46 into engagement in the end of the bar 17 when the bar 17 is advanced into a position laterally aligned with the pin 46. The operation of the servomotor 47 may be manual, but preferably it is automatically intergraded with the movement of the conveyor 26 in order to bring about the engagement of the pin 46 into the bar 17 without manual control. Likewise, the power means operating the main drive shaft 30 may be manually or automatically controlled, and is preferably automatically controlled in order to cause the conveyor 26 to move the chain 27 through a series of interrupted periods of movement sufficient to bring each of the dipping frames 16 sequentially into position to be engaged by the pin 46. Furthermore, operation of the servomotor 43 to drive the rack 42 and thereby rotate the rotatable section 38 may be manually controlled, but is preferably automatically controlled and intergraded with the movement of the conveyor chain 27 and the operation of the servomotor 47 and the pin 46, in order to make the operation of the dipping mechanism automatic. No attempt is made to set forth the exact electronic control for causing the intergraded movement of the chain 27 and the subsequent engagement of the pin 46 into the bar 17, and the rotation thereafter of the section 38. It is believed that such controls are well understood by those skilled in the art of machine design, and that many different types of control mechanisms may be provided. As previously stated, if automatic controls are not desired, each of the steps and each of the operations may be manually controlled and will give satisfactory operation, but will require the constant attention of an operator.

The dipping apparatus as described will advance the dipping frame 16 along the tracks 14 and 15 to the rotation station and there the chain will come to a temporary halt and the pin 46 will be engaged into the ends of the bar 17 on the particular dipping frames in that position. Thereafter, the section 38 will be rotated through a 360° arc and will thereby rotate the cam follow 22 through 360° arc while the axis of the dipping frame, namely the bar 17, is held fixed in all directions except that it is free to rotate. Accordingly, the frame will be rotated about the axis provided by the bar 17, and the glove forms on the end of the arms 19 will travel in an arcuate path downwardly through the solution in the dipping tank 10 and back to its starting position above the tank. Thereafter, the conveyor chain 27 is advanced to bring another frame 16 in the rotation station, while the frame which has just been passed through the tank 10 will be advanced beyond the tank. During the interval between the time when one frame is advanced beyond the tank and before the next frame is brought to the rotation station, the servomotor 43 is reversed to return the rotatable section 38, now empty, back through the path which it formerly traveled and into its original starting position ready to receive the cam follower of the next subsequent dipping frame and again pass through its cycle causing rotation of the forms on the next dipping frame.

As previously stated, it is the object of this invention to pass the glove form through the solution in the tank 11 containing the material which is to form the molded article upon the form 20. Therefore, the chain 27 of the conveyor 26 extends to a point above the deepest part 12 of the tank 11. The conveyor 26 will therefore carry the coagulant coated forms 20 along the tracks 14 and 15 in the upright position illustrated at position D in the Figure 5.

In order to rotate the bar 17 and move the forms 20 in an arcuate path through the deepest part 12 of the tank 11, the cam track 25 is terminated at a position indicated by the reference character 23. At the end of the cam track 25 a second pin and servomotor is provided to again extend into the opening at the end of the bar 17 and hold the bar 17 fixed but free to rotate. The reference character 48 indicates the servomotor employed to actuate a pin 49, illustrated in Figure 9 of the drawings.

The mechanism and operation of this second rotation station is substantially similar in function to the operation of the first station previously described in conjunction with the tank 10, and includes a rack 50 and a servomotor 51 adapted to rotatably drive a pinion gear 52. However, rather than a rotatable channel section 38, as previously described in connection with the first station, a fork member 53 is rotatably driven by the pinion 52. The operation of the servomotor 51 is intergraded, insofar as its stopping and starting is concerned, with the operation of the chain 27 on the conveyor 26 in order to begin operation when a dipping frame 16 is moved into a coupling position with the pin 49 of the second rotation station, and the pin engaged into the end of the bar 17. However, rather than a continuous operation of the servomotor 51 to rotate the mold form 20 through an arcuate path in the tank 11, this servomotor 51 is controlled to rotate rapidly until the fingers of the mold 20 just approach the surface of the liquid within the tank 11. Thereafter, the movement is slowed down until the finger portions of the mold have entered below the surface of the material in the tank 11. Thereafter, the movement is speeded up until the form 20 has traveled through an arcuate path to bring the finger tips of the mold 20 just up to a position where the finger tips begin to come through the surface of the liquid and emerge from the tank. At that point the motion is again slowed down to bring the fingers slowly through the surface of the dipping liquid and out of the liquid to a position where the wrist portion of the mold is still immersed in the liquid but the hand portion is completely out of the liquid. At that position the action of the servomotor 51 is stopped entirely and the mold 20 is allowed to stand in a first dwell position with the wrist portion of the mold still immersed in the liquid. The mold is allowed to stand in this partially immersed position for a predetermined length of time sufficient to allow a further deposit of the material to deposit upon the wrist portion. Thereafter, the servomotor 51 is again actuated until the mold 20 is withdrawn to a position having only a very slight area still remaining in the liquid, whereupon a second dwell period is initiated and the form again allowed to remain in a stationary position.

If desired, the form may remain engaged with the fork member 53 in the position holding the glove form with only the cuff portion immersed. However, as previously stated a considerable period of time is necessary to deposit the necessary thick cuff band portion upon the form. Therefore, if operation of the machinery is stopped and held stationary until the necessary coating is deposited upon the cuff portion, it will readily be apparent that the machine will be inactive for a considerable length of time. The thicker portions of rubber deposit take considerably more time than the thin portion. The thin hand portion is formed in a very rapid dipping movement through the solution and out again, but the cuff portion takes several minutes longer. Accordingly, this invention provides a convenient second conveyor system for picking up the forms after they have been moved to the second dwell position and carrying them along in the position of having the cuff portion slightly immersed until the deposit has been formed, and thereby freeing the balance of the machine for continuous dipping.

A conveyor 55 having a chain 56 carried by two spaced cogs 58 and 59 is arranged to extend over the top of the tank 11 as a working extension of the conveyor 26. The cog 59 is suitably mounted on the framework of the machine, and the cog 58 is mounted upon a drive shaft 60 which is extended transversely of the machine in the region of the end of the tank 11. The drive shaft 60 is connected to the main drive shaft 30 by means of bevel gears 61 and 62. The level of the two conveyors 26 and 55 may be said to be determined by a line drawn between the centers of the cogs operating the respective chains 27 and 56. The level of the conveyor 55 is higher than the level of the conveyor 26, in that a line passing through the centers of the cogs 58 and 59 is at a slightly higher elevation than a line passing through the centers of the cogs 29 and 33. A second cam track 63, substantially similar to the cam track 25 extends from the second rotation station above the deep part 12 of the tank 11 to a position beyond the end of the shallow portion 13 of the tank 11. The cam track 63 begins at the position indicated by the reference character 65. The beginning of the cam track 63 may best be seen in the Figures 3, 5 and 7 of the drawings.

Two spaced track members 66 and 67, corresponding to the tracks 14 and 15, extend in the same longitudinal direction as the cam track 63. The cam track 63 is in fact an extension of the cam track 25, with the second rotation station serving as a bridge between the two portions, and the tracks 66 and 67 are in fact extensions of the tracks 14 and 15, with the second rotation station serving as a bridge therebetween. Figure 7 of the drawings illustrates the fact that the cam track 63 and the tracks 66 and 67 extend substantially in parallel relationship for a considerable period of time after the second rotation station, and therefore the glove molds 20 will remain in substantially a fixed position with the wrist portion of the glove mold immersed in the surface of the liquid. Furthermore, the beginning of the cam track 63, as indicated at the reference character 65, is an upwardly extending surface and therefore will cause the glove mold to move upwardly from the immersed position at position E, illustrated in Figure 7, to the cuff immersed position F, shown in Figure 7. The parallel relationship of cam track and supporting tracks then keeps the glove mold's position with just the cuff portion immersed until the conveyor 55 moves the glove mold to a deflection portion 64 in the cam track 63. When the cam follower 22 strikes the deflection portion 64, the glove mold will be rotated in a counter-clockwise direction and therefore will be lifted up at position G, Figure 7, and over the end of the tank 11. After passing over the end of the tank 11, the cam follower 22 immediately encounters a long tapered downwardly sloping portion on the cam track 63, and therefore the glove mold will be rotated in a counter-clockwise direction to the end of the dipping machine at position H, Figure 7. At the position H the dipping frames are in position to be removed from the machine either by manual labor or by a second machine adapted to perform further completion operation.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Dipping apparatus for depositing a film coating upon a mold form wherein the film has a non-laminated monostructure comprising, a tank for holding dipping solutions, a laterally extending conveyor system including a first and a second conveyor above said tank, drive means advancing said first conveyor by increments of movement separated by periods of rest, drive means advancing said second conveyor at a fixed speed which is less than the average speed of said first conveyor, said first and second conveyor constituting operative extensions of one another, a transfer station from said first conveyor to said second conveyor, said transfer station positioned above said tank, a dipping frame having mold forms thereon, said first conveyor of said conveyor system having engaging and carrying means to transport said dipping frame laterally over said tank to said transfer station, said second conveyor of said conveyor system having engaging and carrying means to transport said dipping frame laterally over said tank from said transfer station, cam and cam follower means for rotating said dipping frame and dipping said mold forms to selected depths at selected speeds into said tank, said cam and cam follower means being related to the length of said conveyor system to thereby relate the dipping action to the position of said mold forms.

2. In a dipping apparatus for depositing a film coating upon a mold form to produce a film having a non-laminated monostructure, the provision of an improved conveyor system to move mold forms through a dipping solution within a dipping tank comprising, first and second laterally spaced tracks, a dipping frame mounted to ride said spaced tracks, conveyor drive means to advance said dipping frame along said tracks, said dipping frame having an axis of oscillatory rotary movement extending in a generally lateral direction between said tracks, a cam follower carried by said dipping frame, a cam track extending in the direction of said spaced tracks, said cam follower contacting said cam track and translating relative movement imposed thereon by the cam track into rotary oscillatory movement of said axis of the dipping frame, said dipping frame having mold forms thereon mounted a distance from said frame axis, said mold forms thereby describing a wave-form path as the frame is advanced along said tracks.

3. Dipping apparatus comprising, a dipping tank, a dipping frame having an axis of oscillatory rotary movement, said frame carrying a plurality of extension arms extending in a radial direction from said axis of the frame, dipping forms carried by said extension arms, and frame conveyor means extending over said dipping tank for transporting and actuating said frame, said conveyor having frame engagement means engaging and transporting said frame, an engagement station having a releasable pivot actuatable to engage said frame with a longitudinally fixed and axially rotatable grip, and frame rotation means coordinated with said releasable pivot to rotate said frame while the frame is held by said releasable pivot.

4. Dipping apparatus comprising, a tank for holding dipping solution, a conveyor track extending above the tank, said conveyor track having a first track portion at a first level, a second track portion at a higher elevation than said first level, the said first and second track portions meeting at a transfer station above said tank, a dipping frame riding said track, said frame having a rotatable axis extending laterally of said track, a plurality of extension arms extending in a radial direction from said axis of the frame, dipping forms carried by said extension arms, first conveyor drive means positioned to move the dipping frame longitudinally along said track as far as said transfer station, second conveyor means positioned to move the dipping frame longitudinally along said track from said transfer station, said second conveyor having an average speed less than the average speed of said first conveyor, and rotation means for said dipping frame positioned to rotate said dipping frame on said first track portion and move said dipping forms through an arcuate path into the solution in said tank and partially out of the said solution, movement of said dipping frame from said first track portion to said second track portion at said transfer station lifting said frame and thereby lifting said forms further out of the solution in said tank.

5. The method of dip coating a glove form having a hand portion and a wrist portion to produce a molded glove having a non-laminated monostructure with a continuous inner wall surface and a continuous stepped outer surface without encouraging the formation of bridging and webbing of the coating fluid between the finger-shaped portions of the glove form, comprising the steps of, first coating the glove form with a material capable of coagulating the coating fluid, then dipping the form into a coating fluid with the finger shaping portions first penetrating the surface of the fluid, removing the glove form part way from the fluid with the finger-shaped portions first emerging from the surface of the fluid, holding said glove form with the hand portion out of the fluid and the remainder partially submerged for a period of time and thereafter raising the entire glove form from said fluid.

6. The method of dip coating a glove form having a hand portion and a wrist portion to produce a molded glove having a non-laminated monostructure with a continuous inner wall surface and a continuous stepped outer surface without encouraging the formation of bridging and webbing of the coating fluid between the finger-shaped portions of the glove form, comprising the steps of, first coating the glove form with a material capable of coagulating the coating fluid, then dipping the form into a coating fluid with the finger shaping portions first penetrating the surface of the fluid, removing the glove form part way from the fluid with the finger-shaped portions first emerging from the surface of the fluid, holding said glove form in a first dwell position with the hand portion out of the fluid and the remainder partially submerged for a period of time, and thereafter raising the glove form to a second dwell position further out of the fluid with a smaller portion remaining submerged, and finally raising the entire glove form from said fluid.

7. In a machine for dip coating a film-like monostructure upon a form having first and second portions to produce a molded hollow article having a non-laminated monostructure with a first portion of a first thickness, and a second portion of a second thickness wherein the inner wall surface of the finished article is continuous and the outer wall surface is stepped, said machine comprising, a tank for holding a dipping solution, a form carrier movably mounted over said tank to carry a form through and out of the solution with the first portion to enter the solution leaving the solution first, and a time control means, said time control means including a first condition which causes movement of the carrier and controls the time of movement of the carrier to move only the first portion of the form out of the solution, a second condition which prevents movement of the carrier and controls the time of non-movement of the carrier to maintain the first portion of the form out of the solution and the second portion of the form in the solution, and a third condition which causes further movement of the carrier and controls the time of movement of the second portion of the form out of the solution thereby forming the said hollow article, said time control means successively activating each said condition in the order of its operation.

8. In a machine for dip coating a film-like monostructure upon a glove form having finger and wrist portions to produce a molded hollow article having a non-laminated monostructure with a finger portion of a first thickness, and a wrist portion of a second thickness wherein the inner wall surface of the finished article is continuous and the outer wall surface is stepped, said machine comprising, a tank for holding a dipping solution, a glove form carrier movably mounted over said tank and adapted to carry a glove form through and out of the solution with the finger portion entering and leaving the solution first, and a time control means, said time control means including a first condition which causes movement of the carrier and controls the time of movement of the carrier to move only the finger portion of the glove form out of the solution, a second condition which prevents movement of the carrier and controls the time of non-movement of the carrier to maintain the finger portion of the glove form out of the solution and the wrist portion of the glove form in the solution, and a third condition which causes further movement of the carrier and controls the time of movement of the wrist portion of the glove form out of the solution thereby forming the said hollow article, said time control means successively activating each said condition in the order of its operation.

9. In a machine for dip coating a film-like monostructure upon a form having first and second portions to produce a molded hollow article having a non-laminated monostructure with a first portion of a first thickness, and a second portion of a second thickness wherein the inner wall surface of the finished article is continuous and the outer wall surface is stepped, said machine comprising, a tank for holding a dipping solution, a form carrier movably mounted over said tank to carry a form downwardly into and upwardly out of the solution with the first portion to enter the solution also leaving the solution first, and a time control means said time control means including a first condition which causes movement of the carrier and controls the time of movement of the carrier to move only the first portion of the form out of the solution, a second condition which prevents movement of the carrier and controls the time of non-movement of the carrier to maintain the first portion of the form out of the solution and the second portion of the form in the solution, and a third condition which causes further movement of the carrier and controls the time of movement of the second portion of the form out of the solution thereby forming the said hollow article, said time control means successively activating each said condition in the order of its operation.

10. The method of dip coating a glove form having a hand portion and a wrist portion to produce a molded glove having a non-laminated monostructure with a continuous inner wall surface and a continuous outer surface without encouraging the formation of bridging and webbing of the coating fluid between the finger-shaped portions of the glove form, comprising the steps of, removing the glove form part way from the fluid with the finger-shaped portions first emerging from the surface of the fluid, holding said glove form with the hand portion out of the fluid and the remainder partially submerged for a period of time and thereafter raising the entire glove form from said fluid.

11. The method of dip coating a glove form having a hand portion and a wrist portion to produce a molded glove having a non-laminated monostructure with a continuous inner wall surface and a continuous stepped outer surface without encouraging the formation of bridging and webbing of the coating fluid between the finger-shaped portions of the glove form, comprising the steps of, dipping the form into a coating fluid with the finger shaping portions first penetrating the surface of the fluid, removing the glove form from the fluid with the finger-shaped portions first emerging from the surface of the fluid, the removing motion being at a non-uniform rate of movement which rate is slower in the area of the wrist portion than the finger portion, holding said glove form with the hand portion out of the fluid and the remainder partially submerged for a period of time and thereafter raising the entire glove form from said fluid.

12. The method of dip coating a glove form having a hand portion and a wrist portion to produce a molded glove having a non-laminated monostructure with a continuous inner wall surface and a continuous outer surface without encouraging the formation of bridging and webbing of the coating fluid between the finger-shaped portions of the glove form, comprising the steps of, removing the glove form from the fluid with the finger-shaped portions first emerging from the surface of the fluid, the removing motion being at a non-uniform rate of movement, holding said glove form with the hand portion out of the fluid and the remainder partially submerged for a period of time and thereafter raising the entire glove form from said fluid.

References Cited in the file of this patent

UNITED STATES PATENTS

| Number | Name | Date |
|---|---|---|
| 1,933,397 | Spanel | Oct. 31, 1933 |
| 1,952,935 | Miller | Mar. 27, 1934 |
| 1,991,118 | Raiche | Feb. 12, 1935 |
| 2,241,176 | Boecler | May 6, 1941 |
| 2,389,319 | McMordie | Nov. 20, 1945 |
| 2,437,109 | Maquat | Mar. 2, 1948 |